United States Patent

Yokooku et al.

[11] 4,376,431
[45] Mar. 15, 1983

[54] AIR-FUEL RATIO CONTROL SYSTEM WITH ALTITUDE COMPENSATOR

[75] Inventors: Katsuhiko Yokooku; Katsuyoshi Iida, both of Hiroshima, Japan

[73] Assignee: Toyo Kogyo Co., Ltd., Hiroshima, Japan

[21] Appl. No.: 247,083

[22] Filed: Mar. 24, 1981

[30] Foreign Application Priority Data

Mar. 29, 1980 [JP] Japan .................................. 55-41080

[51] Int. Cl.³ ............................................. F02M 7/04
[52] U.S. Cl. ..................................... 123/440; 123/492; 60/276
[58] Field of Search ............... 123/440, 489, 492, 438; 60/276, 285

[56] References Cited

U.S. PATENT DOCUMENTS

| | | | |
|---|---|---|---|
| 3,861,366 | 1/1975 | Masaki et al. | 123/438 |
| 4,187,812 | 2/1980 | Hosaka et al. | 123/440 |
| 4,289,103 | 9/1981 | Shinoda | 123/440 |

Primary Examiner—Charles J. Myhre
Assistant Examiner—Andrew M. Dolinar
Attorney, Agent, or Firm—Wenderoth, Lind & Ponack

[57] ABSTRACT

An automobile air-fuel control system is incorporated with an altitude compensator in order to minimize an excessive enrichment of an air-fuel mixture which would occur when the engine is operated at a high altitude under a high load operating condition. This altitude compensator is constituted by a delay circuitry operable to delay the timing at which the supply of bleed air for leaning the mixture is interrupted when the engine is operated at a high altitude under the high loaded condition.

5 Claims, 4 Drawing Figures

AIR-FUEL RATIO CONTROL SYSTEM WITH ALTITUDE COMPENSATOR

BACKGROUND OF THE INVENTION

The present invention generally relates to an air-fuel ratio control system for an automobile internal combustion engine and, more particularly, to an air-fuel ratio control system incorporating an altitude compensator for optimally controlling the air-fuel mixing ratio of a combustible air-fuel mixture while the engine is operated at a high altitude.

Those skilled in the art are familiar with the fact that, in an automobile exhaust system including a three-way catalytic converter effective to minimize not only CO and HC components but also NOx component of the exhaust gases, the three-way catalytic converter can work at its maximum conversion efficiency if the air-fuel mixing ratio of the combustible mixture to be, or being supplied to the engine is controlled so as to be a stoichiometric value. A prior art air-fuel ratio control system embodying this concept comprises a composition sensor effective to detect the concentration of a component, for example, oxygen, contained in the engine exhaust gases and to generate an output signal representative of a function of the air-fuel mixing ratio of the combustible mixture burned in the engine, an air-fuel ratio control including a comparator, a proportionating circuit, an integrator, an adder and a duty radio control circuit which is capable of generating an output signal, the magnitude of which is in dependence on the output signal from the composition sensor, that is, the concentration of the exhaust gas component, and an actuator provided in an automobile carburetor and operable in response to the output signal from the ratio control circuit to adjust the air-fuel mixing ratio by adjusting the amount of bleed air to be admixed with fuel before the fuel is mixed with a primary air in the carburetor.

The U.S. Pat. No. 4,111,170, patented on Sept. 5, 1978, discloses a technique of adjusting the air-fuel mixing ratio by preventing air stepwisely or continuously drawn into a carburetor main fuel passage from being undesirably increased with increases in engine load. This patent discloses the use of a controller capable of comparing the output signal from an exhaust composition sensor, which is representative of the sensed air-fuel mixing ratio of the combustible mixture burned in the engine, with a set or desired air-fuel mixing ratio and generating first and second command output signals when the sensed air-fuel mixing ratio is lower and higher than the set or desired air-fuel mixing ratio, respectively, and a pulse generator operable in response to the first and second command output signals for generating first and second pulse signals, respectively. The first pulse signals are fed to both of first and second electromagnetic flow control valves effective to supply bleed air into the carburetor main and low speed fuel passages, respectively, and are utilized to increase the ratio of the open time of the flow control valves to their closed time to increase the flow of bleed air into the main and low speed fuel passages. On the other hand, the second pulse signals are also fed to the flow control valves, but are utilized to reduce the ratio of the open time of the flow control valves to their closed time to reduce the flow of the bleed air into the main and low speed fuel passages.

The automobile air-fuel ratio control system incorporating with an altitude compensator for optimally controlling the air-fuel ratio while the engine is operated at a high altitude where the density of air and, therefore, the atmospheric pressure is lower than at a level land is disclosed, for example, in the U.S. Pat. No. 4,086,890, patented on May 2, 1978.

As is well known to those skilled in the art, when the automobile engine is operated under a high load, a relatively enriched combustible mixture has to be supplied to the engine in order to maintain an optimum power output constantly during such high load operating condition. However, when the high load operating condition occurs while a vehicle is driven at a high altitude, the relatively enriched combustible mixture tends to be further enriched, that is, the combustible mixture tends to be excessively enriched, because of the reduced atmospheric pressure. Once the combustible mixture is excessively enriched as hereinabove described, not only does waste of automobile fuel occur, but also a relatively large amount of noxious components of the exhaust gases are emitted to the atmosphere.

Moreover, without the altitude compensator, if the driver of a vehicle running at a high altitude desires to appreciate a drivability similar to that available when the vehicle is driven at a level land, the air-fuel ratio control system is operated to enrich the combustible mixture in view of the fact that the atmospheric pressure at the high altitude is lower than at the level land and the charge efficiency of the engine is therefore lowered. Accordingly, the air-fuel ratio control system tends to operate even when the engine of the vehicle running at the high altitude is operated under such an engine operating condition in which it ought not to operate during the running of the vehicle at the level land. Thus the frequency at which the air-fuel ratio control system is operated to enrich the combustible mixture increase with the increased amount of fuel required and also with the increased emission of the pollutants of the exhaust gases to the atmosphere.

The altitude compensator disclosed in the second-mentioned U.S. patent is operable to avoid any possible excessive enrichment of the combustible mixture and is not operatively associated with the air-fuel ratio control system in the sense that they are actuated by the utilization of separate control signals which are electrical and mechanical ones. In other words, the altitude compensator disclosed therein itself operates independently of the actuator for controlling the supply of bleed air, and an electric control signal generated in dependence on the sensed concentration of oxygen contained in the exhaust gases is not utilized to control the operation of the altitude compensator.

SUMMARY OF THE INVENTION

Accordingly, the present invention has for its essential object to provide an improved air-fuel ratio control system with an altitude compensator wherein the altitude compensator is operatively associated with the closed-loop air-fuel ratio control system in such a way as to delay the application of a control signal to the actuator during a particular engine operating condition at a high altitude.

Another important object of the present invention is to provide an improved air-fuel ratio control system of the type referred to above, wherein the altitude compensator is constructed with electric circuit component parts and, therefore, is simple in construction and reliable in performance.

A further object of the present invention is to provide an improved air-fuel ratio control system of the type referred to above, which can be installed in association with any existing closed-loop air-fuel ratio control system without the necessity of manufacturing an engine cylinder block to make it accommodate the altitude compensator.

A still further object of the present invention is to provide an improved air-fuel ratio control system of the type referred to above, which is effective not only to improve the drivability, but to also to minimize the emission of pollutants of the exhaust gases.

According to the present invention, an internal combustion engine including a source of combustible air-fuel mixture, a mixture intake passage means for supplying the combustible mixture from the mixture source to the combustion engine, and exhaust passage means including a catalytic converter installed thereon between the engine and the atmosphere and, is provided with an air-fuel ratio control system which comprises a composition sensor for detecting the concentration of a particular component, for example, oxygen, contained in exhaust gases as a function of the air-fuel mixing ratio of the combustible mixture burned in the engine, a control unit receiving an output signal from the composition sensor and generating a control signal based on the output signal from the composition sensor, an actuator capable of assuming on and off operative positions one at a time, said actuator when brought in the on operative position in response to the control signal regulating the air fuel mixing ratio of the combustible mixture to be supplied to the engine in dependence on the detected concentration of the exhaust gas component to thereby compensate for variation in air-fuel mixing ratio, a high load compensator circuitry for bringing the actuator into the off operative position in response to occurrence of a high load operating condition of the engine and irrespective of the application of the control signal to the actuator, and a delay circuitry for delaying operable in response to reduction in atmospheric pressure for delaying for a predetermined delay time the timing at which the actuator is brought into the off operative position.

Because of the provision of the delay means, the possible excessive enrichment of the combustible mixture, that is, excessive reduction in air-fuel mixing ratio, which would occur when the engine is operated at a high altitude under a high load condition can advantageously be minimized. This in turn brings about improvement in drivability and minimization of the pollutant emission. Moreover, since the delay means operate so as to delay the timing at which the actuator is brought into the on operative position, neither mechanical component parts are required, nor the engine be reworked to accommodate the entire air-fuel ratio control system.

BRIEF DESCRIPTION OF THE DRAWINGS

These and other objects and features of the present invention will become apparent from the following description taken in conjunction with a preferred embodiment with reference to the accompanying drawings, in which.

DETAILED DESCRIPTION OF THE INVENTION

Figure 1:
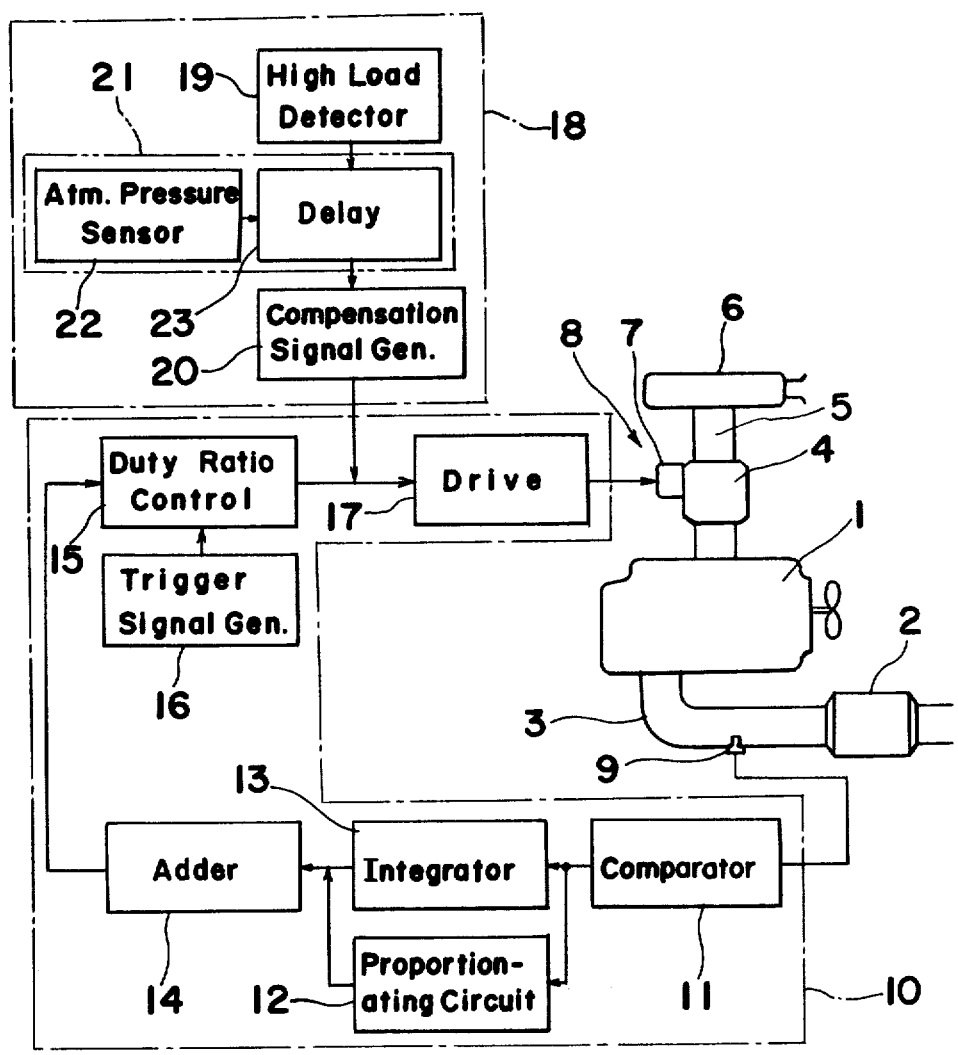
FIG. 1 is a block diagram showing a closed-loop mixture control system for an internal combustion engine embodying the present invention.

Before the description of the present invention proceeds, it is to be noted that like parts are designated by like reference numeral throughout the accompanying drawings.

Referring first to FIG. 1 an automobile power plant comprises an internal combustion engine 1 having a fuel intake system and an exhaust system. The exhaust system includes an exhaust duct 3 having a catalytic converter, for example, a three-way catalytic converter 2, installed thereon. On the other hand, the fuel intake system includes a carburetor 4 of any known construction communicated to one or more engine cylinders (not shown) of the engine 1 by means of an intake duct 5 on the one hand and to the atmosphere through an air cleaner 6 on the other hand. So a shown, the carburetor 4 is provided with an actuator 7 for adjusting the air-fuel mixing ratio of a combustible air-fuel mixture independently of any known throttle valve (not shown) generally built in the carburetor 4, said carburetor 4 and said actuator 7 constituting a fuel control device 8 for adjusting the air-fuel mixing ratio of a combustible air-fuel mixture to be supplied to the engine 1. The actuator 7 forming a part of the fuel control device 8 is constituted by an electromagnetically operated valve assembly operable to adjust the rate of flow of a bleed air to be supplied into the intake duct 5 through the carburetor 4 in such a manner that, when the electromagnetically operated valve assembly is opened in response to an "ON" signal applied thereto as will be described later, the bleed air is introduced to lean the combustible mixture to be supplied to the engine 1.

The exhaust duct 3 has a composition sensor 9, for example, an oxygen sensor, of any known construction installed on a portion of the exhaust duct 3 between the engine 1 and the catalytic converter 2 for sensing the concentration of a selected component, that is, oxygen, of exhaust gases emitted from the engine 1 as a result of and subsequent to combustion of the combustible mixture, said concentration of the selected exhaust gas component being a function of the air-fuel mixing ratio of the combustible mixture which has been burned in the engine 2. This composition sensor 9 is capable of generating an output signal indicative of the sensed concentration of the exhaust gas component, which output signal from the sensor 9 is supplied to an air-fuel ratio control circuitry 10 provided for controlling the operation of the actuator 7 to there by to control the air-fuel mixing ratio of the combustible mixture in dependence on the sensed concentration of the exhaust gas component.

The air-fuel ratio control circuitry 10 comprises a comparator 11 for comparing the output signal from the sensor 9 with a reference signal indicative of a stoichiometric air-fuel mixing ratio and generating a difference signal indicative of the difference in voltage between said output signal from the sensor 11 and the reference signal, a proportionating circuit 12 operable to generate upon receipt of the difference signal a proportionated signal proportional to the difference signal, an integrator 13 connected in parallel to the proportionating circuit 12 and operable to integrate the difference signal, an adder 14 operable to effect an addition of the proportionated signal from the circuit 12 and the integrated signal from the circuit 13 to provide an air-fuel ratio control signal, a duty ratio control circuit 15 for controlling the duty ratio in accordance with the air-fuel ratio control signal fed from the adder 14, a trigger signal generator 16 for applying a trigger signal to the duty ratio control circuit 15, and an actuator drive circuit 17 for driving the actuator 7 in accordance with the duty ratio determined by the duty ratio control circuit 15.

In accordance with the present invention, there is provided a high load compensation circuitry 18 operable to cause the fuel control device 8 to increase the supply of fuel during a high load operating condition of the engine 1. This high load compensation circuitry 18 comprises a high load detector 19 for detecting a parameter indicative of the high load operating condition of the engine 1, which parameter may be either the opening of the throttle valve in the carburetor 4 or the negative pressure developed inside the fuel intake system, for example, the intake duct 5, of the engine 1, and for generating an output signal indicative of the high load operating condition of the engine 1, and a compensation signal generator 20 operable in response to the output signal from the detector 19 to generate a compensation signal required to cause the combustible mixture to be enriched during the high load operating condition of the engine 1, said compensation signal from the generator 20 being applied to the actuator drive circuit 17 in a manner as will be described later.

The high load compensation circuitry 18 includes delay circuitry 21 inserted between the detector 19 and the generator 20. This delay circuitry 21 includes a pressure sensor 22, which may be in the form of a semiconductor strain gauge and is operable to detect changes in atmospheric pressure, and a delay circuit 23 for generating a delay signal for delaying the supply of the output signal from the detector 19 to the generator 20 as the atmospheric pressure detected by the pressure sensor 22 decreases such that the compensation signal from the generator 20 can be delayed in dependence on the reduction in atmospheric pressure.

In the construction so far described with reference to FIG. 1, assuming that the air-fuel mixing ratio of the combustion mixture being supplied to the engine 1 varies with the result that the concentration of the exhaust gas component detected by the composition sensor 9 varies, the comparator 11 generates the difference signal in response to the output signal from the sensor 9. This difference signal from the comparator 11 may be a high level signal where the output signal from the sensor 9 exceeds a predetermined value corresponding to stoichiometric air-fuel mixing ratio required for the three-way catalytic converter 2 to work at its maximum conversion efficiency or a low level signal where the output signal from the sensor 9 is lower than the predetermined value corresponding to such stoichiometric air-fuel mixing ratio. Accordingly, the integrator 13 generates the integrated signal the magnitude of which increases or decreases in response to the high level signal or the low level signal from the comparator 11, respectively. The time during which the difference signal from the comparator 11 is integrated in the integrator 13 is determined by the integrating constant characteristic of the integrator 13 and, accordingly, the integrated signal from the integrator 13 fluctuates from time to time depending on the time at which it is generated from the integrator 13. The air-fuel ratio control signal generated from the adder 14, which is in the form of the integrated signal added to the proportionated signal from the proportionating circuit 12 has such a voltage required to operate the actuator 7 in such a manner as to enrich the combustible mixture when the air-fuel mixing ratio of the combustible mixture sensed by the sensor 9 has been lower than the stoichiometric value and also to operate the same actuator 7 in such a manner as to lean the combustible mixture when the same combustible mixture sensed by the sensor 9 has been higher than the stoichiometric value.

Figure 2:
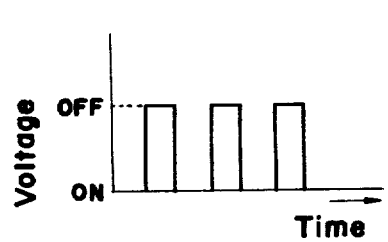
FIG. 2 is a graph showing the waveform of a duty ratio signal generated from a duty ratio control circuit used in the system of FIG. 1.

The duty ratio control circuit 15 is operable to determine the duty ratio of the actuator 7 depending on the voltage of the air-fuel ratio control signal at the time of generation of the trigger signal from the trigger signal generator 16, so that the actuator 7 can be switched on and off in a manner as shown in FIG. 2 according to the duty ratio so determined. Specifically, the lower the voltage of the air-fuel ratio control signal from the adder 14, which is representative of the air-fuel mixing ratio of the combustible mixture sensed by the sensor 9, is than a predetermined value corresponding to the stichiometric air-fuel mixing ratio, the larger the duty cycle of the actuator 7 is, that is, the more the period during which the actuator 7 is switched on is prolonged. (It is to be noted that the duty cycle is the duty cycle expressed as a percentage). On the other hand, the higher the voltage of the air-fuel ratio control signal is than the predetermined value corresponding to the stoichiometric air-fuel mixing ratio, the smaller the duty cycle of the actuator 7 is, that is, the shorter the period during which the actuator 7 is switched on is.

However, when the high load detector 19 detects that the engine 1 is operated under a high load and, therefore, generates the high load signal, the compensation signal generator 20 generates the compensation signal required to lower the air-fuel mixing ratio of the combustible mixture to be supplied to the engine 1, which compensation signal is in turn applied to the drive circuit 17 together with the duty ratio signal generated from the duty ratio control circuit 15. This compensation signal generated from the generator 20 in response to the high load signal from the detector 19 is operable, independently of variations of the duty ratio signal and, hence, even when the actuator 7 is fully closed with the duty cycle being zero percent, to increase the supply of fuel from the fuel control device 8 thereby reducing the air-fuel mixing ratio, that is, enriching the combustible mixture to be supplied to the engine.

Figure 3:
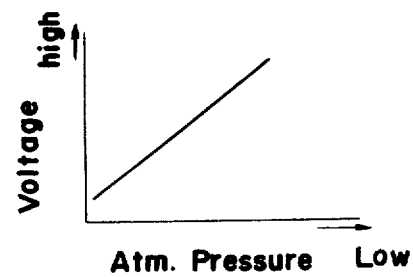
FIG. 3 is a graph showing change in voltage of an output signal from an atmospheric pressure sensor used in the system of FIG. 1.

The timing at which the generator 20 generates the compensation signal in response to the high load signal may be delayed when the engine 1 is operated at high altitude under the high load condition, because of the provision of the delay circuitry 18. This will now be described. As is well known to those skilled in the art, the atmospheric pressure decreases as the altitude increases. Accordingly, the sensor 22 generates the output signal, the voltage of which increases proportionally with decrease of the atmospheric pressure sensed thereby as shown in FIG. 3. The delay circuit 23 is operated in response to the output signal from the sensor 22 to generate the delay signal necessary to delay the supply of the high load signal from the detector 19 to the generator 20 according to decrease of the atmospheric pressure so that the period during which the supply of fuel from the fuel control device 8 is increased can be reduced to refrain the combustible mixture to be supplied to the engine 1 from being enriched.

Figure 4:
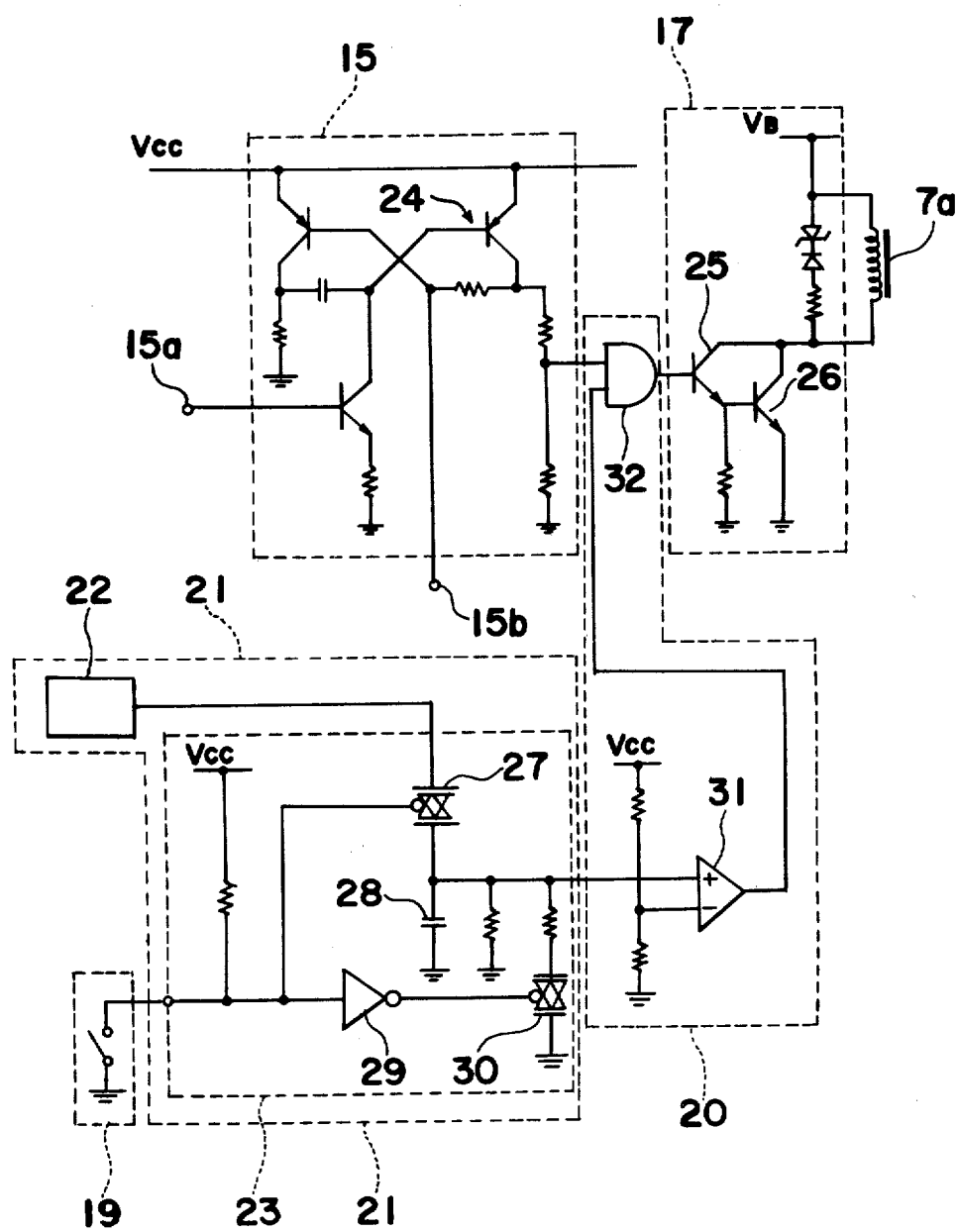
FIG. 4 is a circuit diagram showing the details of a high load compensation assembly employed in the system of FIG. 1.

The details of the delay circuitry 18 are shown in FIG. 4 together with those of a related portion of the air-fuel ratio control circuitry 10.

Referring now to FIG. 4, the duty ratio control circuit 15 comprises an oscillator or multivibrator 24 adapted to receive the air-fuel ratio control signal from the adder 14 through an input terminal 15a and also the trigger signal from the trigger signal generator 16 through an input terminal 15b. The duty ratio signal emerging from the control circuit 15 is applied to the drive circuit 17 through an AND gate 32. The drive circuit 17 includes switching transistors 25 and 26, said transistor 25 being switched on upon receipt of the duty ratio signal from the control circuit 15, followed by the switching-on of the transistor 26 to energize a solenoid unit 7a of the electromagnetic valve forming the actuator 7 to open the latter.

The delay circuit 23 comprises a first analog switch 27, a capacitor 28, an inverter 29, and a second analog switch 30. The first analog switch 27 is adapted to be closed during the absence of the high load signal from the high load detector 19, that is, during the opening of a detector switch forming the high load detector 19, to permit a voltage of the output signal from the pressure sensor 22 to be charged on the capacitor 28. A junction between the first analog switch and the capacitor 28 is connected to an non-inverting input terminal of a comparator 31 forming a part of the compensation signal generator 20.

The second analog switch 30 is adapted to be closed during a period in which the output signal from the detector 19 generated as a result of closure of the detector switch forming the detector 19 is inverted by the inverter 29, to lower the voltage supplied to the non-inverting input terminal of the comparator 31.

The AND gate 32 forming a part of the compensation signal generator 20 together with the comparator 31 is interposed between the duty ratio control circuit 15 and the drive circuit 17 and is adapted to receive both the duty ratio signal from the control circuit 15 and an output signal from the comparator 31, said AND gate generating an output voltage signal to the drive circuit 17 when both of said duty ratio signal and said output signal from the comparator 31 are applied thereto.

The high load compensation circuitry 18 including the delay circuitry 21 operates in the following manner. Assuming that the engine 1 is operated under a high load condition and the detector 19, therefore, detects, for example, the fully opened condition of the throttle valve in the carburetor 4 with its detector switch consequently closed, the high load signal indicative of the high load operating condition of the engine 1 generated from the detector 19. With this high load signal, the first analog switch 27 and the second analog switch 30 are switched off and on, respectively.

So long as the high load operating condition has occurred while the engine 1 is operated at a level land, the maximum voltage charged on the capacitor 28 during the previous switching-on of the first analog switch 27 due to the opening of the detector switch of the detector 19 is not only lower than a predetermined reference voltage applied to the inverting input terminal of the comparator 31, but also fed to the ground through the second analog switch 30, and therefore, the comparator 31 continues to generate an OFF signal or a low level signal to the AND gate 32.

So long as the OFF signal is applied from the comparator 31 to the AND gate 32, the latter is switched off irrespective of the application of the duty ratio signal thereto, resulting in that the transistors 25 and 26 are kept in non-conducting state without the solenoid unit 7a of the actuator 7 being energized. Accordingly, in this condition, the electromagnetic valve forming the actuator 7 is closed to permit the supply of fuel from the fuel control device 8 to be substantially increased by reducing the supply of the bleed air, thereby enriching the combustible mixture to be supplied to the engine 1. By so doing, the drivability of the engine under the high load operating condition can advantageously be improved.

On the other hand, when the engine is operated under the high load condition at a high altitude, the maximum voltage charged on the capacitor 28 during the previous switching-on of the first analog switch 27 due to the opening of the detector switch of the detector 19 is higher than the predetermined reference voltage applied to the inverting input terminal of the comparator 31. However, simultaneously with the switching-off of the first analog switch 27 and the switching-on of the second analog switch 30, the capacitor 28 discharges the stored voltage which flows in part to the ground through the second analog switch 30 and in part to the non-inverting input terminal of the comparator 31, and the comparator 31 generates an ON or high level signal during a predetermined period in which the voltage discharged from the capacitor 28 is higher than the reference voltage applied to the inverting input terminal of the comparator 31. Accordingly, although the AND gate 31 is switched on in response to the ON signal fed from the comparator 31, it can readily be switched off after the predetermined period of time, that is, after the voltage discharged from the capacitor 28 has fallen below the reference voltage applied to the inverting input terminal of the comparator 31. In other words, the timing at which the AND gate 31 which has been switched on is switched off is delayed for a predetermined time during which the voltage discharged from the capacitor 28 is higher than the reference voltage at the inverting input terminal of the comparator 31. After the lapse of this predetermined time, that is, when and after the AND gate 32 has been switched off, the solenoid unit 7a of the actuator 7 is deenergized, as is the case of the engine being operated at the level land, and, therefore, the electromagnetic valve of the actuator 7 is closed to interrupt the supply of the bleed air thereby permitting the increased supply of fuel from the fuel control device 8 so that the combustible mixture to be supplied to the engine 1 can be enriched.

In this way, the enrichment of the combustible mixture to be supplied to the engine 1 is advantageously suppressed only during the period of time in which the voltage charged on the capacitor 28 in dependence on reduction of the atmospheric pressure is discharged to a value lower than the reference voltage at the inverting input terminal of the comparator 31.

It is to be noted that, in the event that the detector switch of the high load detector 19 is opened while the engine 1 is operated at the high altitude, the first and second analog switches 27 and 30 are switched on and off, respectively, with the comparator 31 consequently generating the ON signal to establish a closed-loop air-fuel ratio control system wherein the actuator 7 is controlled by the duty ratio signal from the control circuit 15.

From the foregoing description, it has now become clear that, because of the provision of the delay circuitry effective to delay the operation of the high load compensation circuitry depending on changes in the in atmospheric pressure, any possible excessive enrichment of the combustible mixture to be fed to the engine 1 which would take place when the engine is operated at a high altitude under a high load operating condition can advantageously be avoided. This substantially brings about saving of fuel and also minimizes the emission of pollutants, contained in the exhaust gases, to the atmosphere.

Although the present invention has fully been described by way of example with reference to the accompanying drawings, it is to be noted that various changes and modifications are apparent to those skilled in the art. For example, although the output signal from the high load compensation circuitry 18 has been described as applied to the drive circuit 17, it may be applied to any one of the other circuit components of the air-fuel ratio control circuitry 10, for example, to an input terminal of the comparator 11 together with the output signal from the sensor 9.

Moreover, although the delay circuitry 21 has been described as inserted between the high load detector 19 and the compensation signal generator 20, it may be connected in such a way as to enable an output from the delay circuitry 21 to be fed to the detector 19 or connected to an output terminal of the generator 20. However, the interposition of the circuitry 21 between the detector 19 and the generator 20 such as described and shown is advantageous in that the closed-loop air-fuel control system can readily be assumed when the engine operating condition shifts from the high load operating condition to a low load operating condition. In addition, instead of the delay circuitry 21 being composed of electric and/or for electronic component parts, it may be constituted by mechanical component parts.

Furthermore, although the fuel control device 18 has been described as constituted by the carburetor 4 and the actuator 7 for adjusting the rate of flow of bleed air, this means for adjusting the air-fuel mixing ratio of the combustible mixture may be of any known construction.

Accordingly, such changes and modifications are to be understood as included within the true scope of the present invention unless they depart therefrom.

We claim:

1. An air-fuel ratio control system for an internal combustion engine including a combustion chamber, a mixture intake passage means for supplying a combustible mixture to the combustion chamber, and exhaust passage means including a catalytic converter installed thereon between the engine and the atmosphere, said control system comprising a composition sensor provided on the exhaust passage means at a position between the engine and the catalytic converter for detecting the concentration of a particular component obtained in exhaust gases emitted from the engine, said concentration being a function of the air-fuel mixing ratio of the combustible mixture burned in the engine, a control unit receiving an output signal from the composition sensor and generating a control signal based on the output signal from the composition sensor, an actuator for regulating the air-fuel mixing ratio of the combustible mixture to be supplied to the combustion chamber in response to the control signal from the control unit, a high load compensator circuitry for bringing the actuator into a predetermined operative position for supplying a enriched combustible mixture to the combustion chamber in response to an occurance of a high load operating condition of the engine and irrespective of the application of the control signal to the actuator, and a delay circuitry operable in response to reduction in atmospheric pressure for delaying for a predetermined delay time the timing at which the actuator is brought into the predetermined operative position.

2. A system as claimed in claim 1, wherein said high load compensator comprises a high load detector for detecting the high load engine operating condition and generating the high load signal indicative of the occurrence of the high load engine operating condition and a compensation signal generator operable in response to the high load signal for generating a compensation signal, said compensation signal being applied to the actuator to bring the latter into a predetermined operative position irrespective of the control signal.

3. A system as claimed in claim 2, wherein said delay circuitry is inserted between the high load detector and the compensation signal generator.

4. A system as claimed in claim 3, wherein the delay circuitry comprises a RC circuit having a predetermined time constant determinative of the predetermined delay time and includes a sensor for detecting change in atmospheric pressure.

5. A system as claimed in claim 1, wherein said intake passage comprises a carburetor, said carburetor being provided with said actuator, for thereby regulating the air-fuel mixing ratio of said combustible mixture.

* * * * *